United States Patent
Zou et al.

(10) Patent No.: US 9,589,136 B2
(45) Date of Patent: Mar. 7, 2017

(54) METHOD AND DEVICE FOR EXTRACTING MESSAGE FORMAT

(71) Applicant: Tencent Technology (Shenzhen) Company Limited, Shenzhen Guangdong (CN)

(72) Inventors: Zan Zou, Shenzhen Guangdong (CN); Xiaokang Zhang, Shenzhen Guangdong (CN); Zhi Wang, Shenzhen Guangdong (CN); Chunfu Jia, Shenzhen Guangdong (CN); Lu Liu, Shenzhen Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 44 days.

(21) Appl. No.: 14/674,717

(22) Filed: Mar. 31, 2015

(65) Prior Publication Data
US 2015/0205963 A1 Jul. 23, 2015

Related U.S. Application Data

(63) Continuation of application No. PCT/CN2013/089913, filed on Dec. 19, 2013.

(30) Foreign Application Priority Data

Apr. 15, 2013 (CN) .......................... 2013 1 0130639

(51) Int. Cl.
G06F 21/00 (2013.01)
G06F 21/56 (2013.01)

(52) U.S. Cl.
CPC .......... *G06F 21/566* (2013.01); *G06F 21/567* (2013.01); *G06F 2221/033* (2013.01)

(58) Field of Classification Search
USPC .......................................................... 726/23
See application file for complete search history.

(56) References Cited

U.S. PATENT DOCUMENTS

2008/0271147 A1* 10/2008 Mohanan .............. G06F 21/552
726/24
2011/0030060 A1 2/2011 Kejriwal
(Continued)

FOREIGN PATENT DOCUMENTS

| CN | 101009706 A | 8/2007 |
| CN | 101482907 A | 7/2009 |

(Continued)

OTHER PUBLICATIONS

TEMU: Binary Code Analysis via Whole-System Layered Annotative Execution, Heng Yin & Dawn Song, Electrical Engineering and Computer Sciences University of California at Berkeley, Technical Report No. UCB/EECS-2010-3, Jan. 11, 2010, pp. 1-12.*

(Continued)

*Primary Examiner* — Jason Lee
(74) *Attorney, Agent, or Firm* — Brinks Gilson & Lione (57) ABSTRACT

Examples of extracting a message format are disclosed. Extracting the message format may include capturing an execution trace of a malicious program client and identifying and analyzing a processing procedure of a message in the execution trace. An input message format is identified based on the analysis, where the input message format is of a communication protocol used by a malicious program. The examples of identifying the message format provide increase extraction efficiency, accurate analysis and positioning, and a reduced rate of false positives.

15 Claims, 4 Drawing Sheets

(56) References Cited

U.S. PATENT DOCUMENTS

| | | | | |
|---|---|---|---|---|
| 2011/0302654 A1* | 12/2011 | Miettinen | ............ | G06F 21/566 |
| | | | | 726/23 |
| 2012/0158975 A1* | 6/2012 | Hogoboom | ............ | H04L 69/22 |
| | | | | 709/228 |
| 2012/0222120 A1* | 8/2012 | Rim | ...................... | G06F 21/566 |
| | | | | 726/24 |

FOREIGN PATENT DOCUMENTS

| | | |
|---|---|---|
| CN | 101540704 A | 9/2009 |
| CN | 101667979 A | 3/2010 |
| CN | 102592078 A | 7/2012 |
| CN | 102651062 A | 8/2012 |
| GB | 2 418 563 A | 3/2006 |

OTHER PUBLICATIONS

Office Action dated Aug. 10, 2015 for corresponding Chinese Application No. 201310130639.7, 7 pages.

International Search Report and Written Opinion, dated Mar. 27, 2014, pp. 1-13, issued in International Application No. PCT/CN2013/089913, State Intellectual Property Office of the P.R. China, Beijing, China.

\* cited by examiner

METHOD AND DEVICE FOR EXTRACTING MESSAGE FORMAT

The present application is a continuation of International application PCT/CN2013/089913, filed on Dec. 19, 2013, which claims the priority to Chinese Patent Application No. 201310130639.7, entitled as "METHOD AND DEVICE FOR EXTRACTING MESSAGE FORMAT", filed on Apr. 15, 2013 with State Intellectual Property Office of People's Republic of China, which are incorporated herein by reference in their entirety.

FIELD

The disclosure relates to the field of information security technology, and in particular, to a method and a device for extracting a message format.

BACKGROUND

A malicious program is typically a program installed in a device, such as a computer, to enable controlling the device by a remote input message. A communication protocol is usually defined specifically for the malicious program. Therefore, exploration of the communication protocol is fundamental for analyzing and preventing suspicious activity by the malicious program. Analyzing a network communication protocol, such as that of the malicious program and speculating about and extracting a format specification for a communication message used by the communication protocol may be referred to as "protocol reverse engineering". However, in the existing methods, data packets are analyzed through statistical analysis, or the command and control protocol is found by virus analysts manually. These techniques result in a large human resource investment, low analysis efficiency, long analysis time, and high false negative rate.

SUMMARY

A method and a device for extracting a message format are provided according to embodiments of the disclosure, for automatically extracting a message format of a communication protocol being used by a malicious program. The described techniques solve the technical problems in current methods enhance degree of automation, reduce reliance on human experience and labor cost, increase extraction efficiency, and decrease false negative rate. Various other advantages of the described techniques will be evident to a person skilled in the art based on the description provided.

The method for extracting the message format may include at least the following steps. The method may involve capturing an execution trace of a malicious program client and analyzing a procedure to process an message in the execution trace, and extracting a message format of a communication protocol being used by the malicious program. The message may be an input message from the malicious program. The malicious program client may be a host program that may be used by the malicious program to control the device the malicious program client is executing on.

The device for extracting the message format may include a capturing unit, and an analysis and extraction unit. The capturing unit may capture an execution trace of a malicious program client. The analysis and extraction unit may analyze a processing procedure of a message in the execution trace captured by the capturing unit. A message format of a communication protocol being used by a malicious program may be extracted based on the analysis. The malicious program may be using the communication protocol and particularly the message format to control the device via the malicious program client.

In the technical solution, by analyzing the execution trace of the malicious program client, the input message format of the communication protocol for the malicious program may be extracted automatically without any manual operation. Thus, degree of automation is enhanced, reliance on human experience and labor cost are reduced, and extraction efficiency is increased. Further, by analyzing the execution trace of the malicious program client, system level semantic information may be provided, and a fine-grained analysis on malicious codes may be implemented. Therefore, analysis and positioning are accurate and false positive rate is decreased.

BRIEF DESCRIPTION OF THE DRAWINGS

Drawings used in the description of embodiments are explained briefly as follows for better understanding of the technical solutions in embodiments of the disclosure. The drawings example views of some of embodiments of the disclosure. Other drawings and embodiments may be obtained by those skilled in the art based on the drawings and description without any creative work.

DETAILED DESCRIPTION

In order to make the object, the technical solutions and the advantages of the disclosure more clear, the embodiments of the disclosure will be further described in detail below in conjunction with the accompanying drawings. Embodiments described are merely some of embodiments of the disclosure. Any other embodiments obtained by those skilled in the art based on the embodiments in the disclosure without any creative work should fall within the scope of protection of the disclosure.

Figure 1:
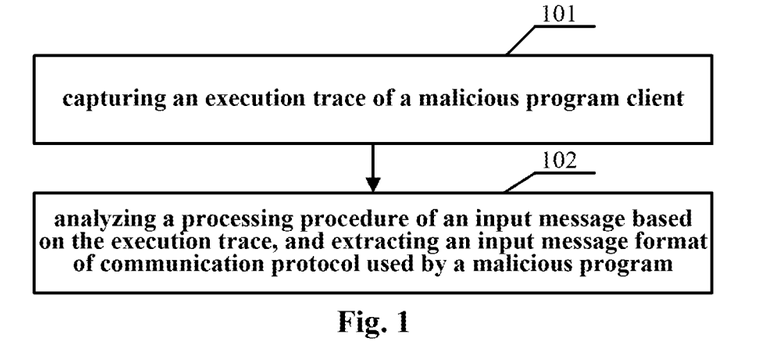
FIG. 1 is an example flow chart of a method according to an embodiment of the disclosure.

As shown in FIG. 1, a method for extracting a message format according to an embodiment of the disclosure includes at least the following steps 101 to 102.

Step 101 may include capturing an execution trace of a malicious program client. The malicious program client may be a software application, process, or any other program that may be executing on a device being analyzed for extraction of the message format. For example, the malicious program client may be an instant messaging client, word processing program, graphic processing program, or any other program executing on the device being analyzed. The device executing the malicious program client may be a desktop computer, server computer, laptop computer, tablet computer, smart phone, wearable electronic device, or any other device capable to execute a program. The malicious program client may or may not be installed on the device. The malicious program may embed messages within execution of the malicious program client, and possibly remotely control the device. For example, in case of the malicious program client being an instant messaging client, the malicious program may embed a malicious command within a message received by the instant messaging client. The malicious command may execute along while the received message is being processed by the instant messaging client. The malicious program, thereby, may be able to gain access to the device and/or data on the device.

Capturing the execution trace of the malicious program client may involve monitoring an execution procedure of the malicious program client in real time by a binary code analysis platform. Further, execution trace of the procedure followed to process an input message from the malicious program may be captured.

Step 102 may include analyzing the captured procedure to process the input message in the execution trace. Further, an input message format of a communication protocol being used by the malicious program may be extracted based on the analysis. The input message format may provide a pattern of data used by the malicious program to communicate commands to the device. The input message format may be embedded within regular communication of data performed by the malicious program client, such as an instant message received by the instant messaging client in the earlier example.

In the technical solution according to an embodiment, by analyzing the execution trace of the malicious program client, the input message format of the communication protocol of the malicious program is extracted automatically without manual operation. Therefore, degree of automation is enhanced, reliance on human experience and labor cost are reduced, and extraction efficiency is increased. Further, by analyzing the execution trace of the malicious program client, system level semantic information is provided, fine-grained analysis on malicious codes is implemented. Thus, analysis and positioning are accurate, and false positive rate is decreased.

In an example, analyzing the processing procedure of the input message in the execution trace in step 102, may involve at least the following steps. Stain marking may be performed on the execution trace, and the input message may be divided into fields based on a stain propagation record of a mark. A function call relationship in the processing procedure of the input message may be identified, based on which a function relationship of the processing procedure of the input message may be established. Based on the function relationship, a semantic information of the functions in the execution trace may be predicted and/or identified.

The determining a function call relationship of the processing procedure of the input message and establishing a function relationship of the processing procedure of the input message may include at least the following steps.

A function call instruction and a function return instruction used in the processing procedure of the input message may be determined. A real-time function call stack used in the processing procedure of the input message may be determined based on the function call instruction and the function return instruction. Further, a hierarchical division of the functions may be performed based on the function call stack.

Predicting and identifying the semantic information of functions in the execution trace based on the function relationship of the processing procedure of the input message may include at least the following steps.

A semantic queue may be created for each byte of the input message. The semantic queue may be enabled to store a system function related to the corresponding byte.

Further, for each byte of the input message, the execution trace may be searched for a stain mark. If the stain mark exists in a system function, the system function may be identified as being related to the processing procedure and the system function may be added into the semantic queue of the stain mark. The semantic information of the input message may be determined based on the semantic queue corresponding to each byte of the input message.

Dividing the input message into fields based on a stain propagation record of a mark may include at least the following steps.

A data structure tree may be created, which initially comprises a root node that represents the input message. In the data structure tree, a leaf node represents a minimum field of the input message and a node which is not the leaf node or the root node represents a subordinate relationship between the fields of the input message. Nodes may be added to the tree data structure while traversing the stain propagation records. The stain propagation records may be traversed sequentially and stain offsets in a stain mark sequence may be determined. If the stain mark sequence of a current item comprises continuously-numbered stain offsets, bytes corresponding to the successively-numbered stain offsets may be marked as being a part of one single field of the tree data structure. If no node for the field has been created, a new node for the field is created and added to the tree data structure.

The stain propagation records may thus be traversed and the stain offsets in the stain mark sequence determined. If the stain mark sequence of a current item being traversed contains a stain offset of a formerly-generated node, the field corresponding to the formerly-generated node is identified as containing the current item. The method further involves creating a new node, if the stain offset of a formerly-generated node is not found, and further creating or identifying a node for the field to be used as a parent node of the formerly-generated node and linking the parent node to the new node. The above steps may be repeated until the stain mark sequence of a current item comprises no stain offset of a formerly-generated node.

The extracting an input message format of a communication protocol for a malicious program may include determining the input message format of the communication protocol for the malicious program based on the semantic information of the functions in the execution trace, the divided fields of the input message, and the hierarchical division of the functions.

The above mentioned steps involved in capturing the execution trace of the malicious program client and analyzing the processing procedure of the input message in the execution trace are further explained. These steps use a binary code analysis platform, an execution trace, and a stain analysis, which are also described below.

1. Binary Code Analysis Platform

In order to analyze the malicious program in a comprehensive and fine-grained manner, an analysis platform (also referred to as a full system simulation platform) is established to analyze a behavior of binary codes of a malicious program client according to an embodiment of the disclosure. The analysis platform may include mounting a binary analysis module on a virtual machine, where the binary analysis module may include a dynamic part and a static part. The dynamic part may provide a dynamic analysis of the full system environment. The dynamic part may monitor execution of a specific process in real time, and record real-time system information and instructions during the execution of the process. The dynamic part may generate an execution trace of the executing program based on the monitored and recorded information. The static part may analyze the execution trace. The static part may perform data analysis on system condition information included in the execution trace and extract an input message format of a communication protocol. The message format may be identified and extracted based on repeatedly observing a data pattern of the input message in the execution trace.

The analysis platform may be further capable of obtaining a system call sequence of a process and distribution of dynamic link libraries used by the process. The analysis platform may further obtain a packet received by the system, such as over a communication network, and record a stain mark for each byte of the packet. The analysis platform may be further capable of setting a hook for a system call, and dynamically monitoring a call of the hook. The analysis platform may be able to extract a parameter value and a return value of the system call and/or hook. The analysis platform may generate the execution trace including whole system information of execution instructions.

Various examples of the analysis platform may have different capabilities. Further, as described in the present disclosure, and will be obvious to a person skilled in the art, different examples may use different capabilities of the analysis platform.

2. Execution Trace

The execution trace is data generated by dynamically monitoring an executing or a running program in a system. The execution trace may be a whole record of one behavior trace of a process, and may include real-time information of the process during the period of monitoring. Dynamic information may be such as process information, module information, thread information, an execution instruction, an instruction operand, an operand stain mark, and a register status, among other information recorded. The execution trace provides data for analysis of the program behavior. The execution trace may be generated and recorded as a file, or may be stored in a database or in any other format to enable access of the recorded information.

3. Stain Analysis

Stain analysis is a technique for marking an execution trace of a program. With stain analysis, external data entering the system may be marked with "a stain". For example, network input data and keyboard input data may be marked with stain types, stain sources and offsets. During execution of instructions of the program, propagation of the stained data may be dynamically recorded. Thus, insights regarding how the stained data is processed may be gained by monitoring the propagation of the stained data. An example propagation rule of a stain mark may be as follows: according to semantic information of each executed instruction, in the case that an operand performs a write operation or a calculation operation on another operand, if the former operand is marked with a stain mark, the other operand is also marked with the same stain mark.

Figure 2:
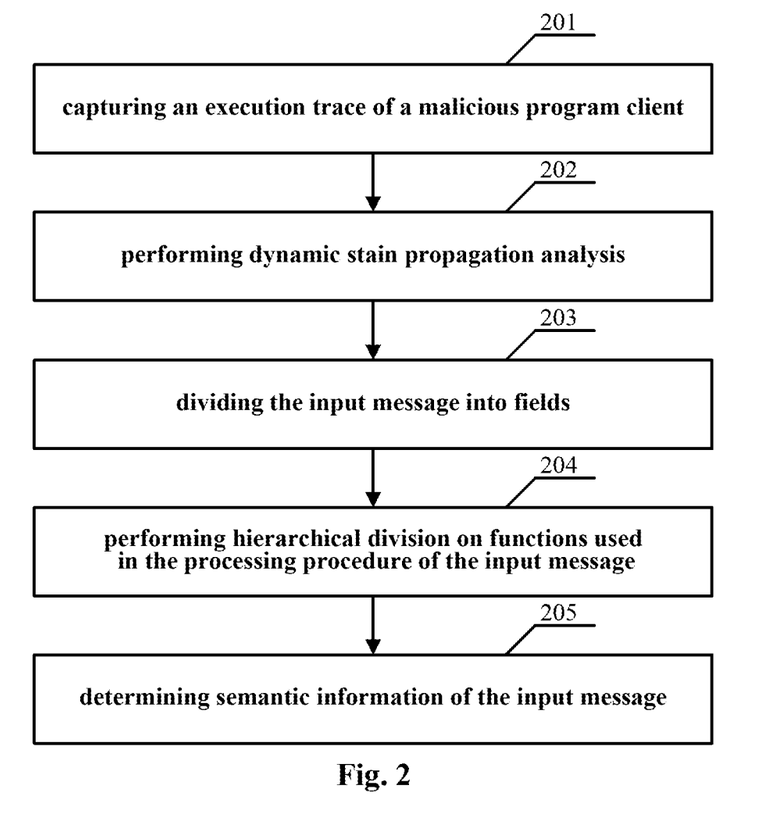
FIG. 2 is an example flow chart of a method according to an embodiment of the disclosure.

FIG. 2 is an example flow chart of a method according to an embodiment. The method includes at least the following steps.

Step 201 may include capturing an execution trace of a malicious program client.

The communication protocol of the malicious program is implemented by a communication procedure between a server and the client. While, a malicious program server may not be obtained, the client may be obtained. Therefore, in this example, it is supposed that the malicious program client has already been obtained. Step 201 may proceed to capture the execution trace of the malicious program client in the binary code analysis platform, which may include the following steps 201A to 201E.

Step 201A may include starting the analysis platform, copying a malicious program client to be analyzed into a system, and running the malicious program client.

Step 201B may include dynamically monitoring the malicious program client by the analysis platform. In this case, the malicious program client may establish a network connection with the server and start communication.

Step 201C may include, in response to receipt of an input message data by the client through the network, sequentially marking each byte of application layer data with a stain. The stain may be a serial number which is also referred to as a stain offset. According to the embodiment, it is supposed that one input message is made up of application layer data of one network packet, the stain offset of the first byte of the message is set to be 0, and the stain offset of a next byte is added by 1, and so on. Other offset sequences may be used in other examples.

Step 201D may include, recording the processing procedure of the input message as performed by the malicious program client. The recorded real-time information may be recorded and/or stored into an execution trace file. An attribute corresponding to each instruction that may be executed during processing of the input message may include an instruction address, an instruction type, an operand type, an operand address, an operand value, stain mark information of an operand, and a stain offset set of an operand.

Step 201E may include extracting information from the execution trace, such as the number of instructions executed by the program, the content of the input message, the stain mark of each byte of the input message, the distribution of system function modules, system functions run and called by the program. The data may be used for further analysis to identify the message format.

Step 202 may include performing dynamic stain propagation analysis.

In step 202, the execution trace obtained in step 201 may be analyzed, and propagation of the stain mark of each byte of the input message during the processing procedure of the input message may be extracted. The stain mark of the input message in the instructions of the execution trace file may be represented as follows. In the case that an operand of an instruction is stained, "T1" is marked following the operand and a corresponding stain offset follows "T1". The extracted contents for each stain mark include the stain offset of the stain mark, the number of instructions to which the stain is propagated, and content and address of each of the instructions.

A stain propagation record table may be created. The table may include a column to record instruction memory address and a column for stain mark sequence. The table may record the instructions to which the stain marks are propagated. The stain mark sequence is made up of stain mark offsets propagated to the instructions stored in the addresses corresponding to the stain mark sequence, where the number of the stain offsets in the stain mark sequence is greater than or equal to 1. The stain propagation record may be extracted from the execution trace, i.e. all of the instructions in the execution trace are traversed and executed sequentially, and the following steps 202A to 202C are executed for each of the instructions.

Step 202A may include checking whether there is a stain mark in the current instruction, proceeding to step 202B if there is a stain mark in the current instruction; otherwise, processing a next instruction.

Step 202B may include checking whether address of the current instruction exists in the column of instruction address in the stain propagation record table. If the address does not exist in the column of instruction address, a new item may be created in the table and the address of the current instruction and the stain mark offset included in the current instruction may be recorded into the new item. Alternatively, if the address exists in the column of instruction address, step 202C may be initiated.

Step 202C may include extracting the stain mark sequence corresponding to the address of the current instruction in the table. It may be then determined, whether the stain offset included in the current instruction exists in the stain mark sequence. The stain offset may be added into the stain mark sequence if the stain offset does not exist in the stain mark sequence.

Thus, using at least the steps as described, the stain propagation record of the stain marks of the input message included in the execution trace of the processing procedure that the malicious program client performs on the input message may be established. In step 203, the stain propagation record table may be used to divide the input message into multiple fields.

Step 203 may include dividing the input message into fields.

In the communication protocol, one input message may be made up of multiple fields. Each field may have its own function and semantic information. Different fields may have different lengths. During the processing procedure of the input message, the malicious program client may process each field of the input message read from an input message buffer. The different fields may be processed in different ways, and bytes in one filed may be processed in the same way. Therefore, the input message may be divided into fields based on propagation of the stain marks of all the bytes in the input message during the execution of the instructions. A specific processing flow is described as follows.

Step 203A may include creating a tree structure, which initially includes a root node, where the root node represents a whole input message, and descendant nodes of the root node represent the fields and sub-fields of the input message.

Step 203B may include traversing all items in the stain propagation record table sequentially, and determining the stain offsets in the stain mark sequences; if the stain mark sequence of the current item is made up of multiple continuously-numbered stain offsets, taking the message bytes corresponding to the multiple continuously-numbered stain offsets as one field; if no node corresponding to the field exists in the tree, creating a new node for the filed; and if a node corresponding to the filed already exists in the tree, not recreating.

Step 203C may include traversing all the items in the stain propagation record table again, and determining the stain offsets in the stain mark sequences. If the stain mark sequence of the current item includes the stain offsets of two or more nodes created in step 203B, it may be determined whether the fields corresponding to the two or more nodes belong to one big field. If that is the case, a new node for the big field may be created to be used as a parent node of the two or more nodes, and linking the parent node with the two or more nodes, such as by making the pointer of the two or more nodes point to the new node.

Step 203D may include, in response to any new node created in step 203C, performing step 203C again; otherwise, ending the flow.

With steps 203A-203D, a field division tree may be obtained, where the root node represents the whole input message, the leaf node represents a minimum field, and a node which is not a leaf node or a root node represents subordinate relationship between the fields of the input message.

Step 204 may include performing hierarchical division on functions used in the processing procedure of the input message.

In this step, function call instructions and function return instructions used during running the client program are analyzed, a real-time function call stack during running the program is analyzed, and accordingly the hierarchical division of the functions is implemented. The system uses stack to implement function calls and the function calls are usually nested. Call information of multiple functions may be stored in the stack at a same time, and each function may occupy a continuous area i.e. sequential memory addresses. A function calling convention is typically responsible for parameter transferring sequence (from left to right or from right to left) and cleaning the stack occupied by the parameter. Function calling conventions for different Central Processing Units (CPUs) and different compilers may be different, however a calling function and a corresponding called function typically use the same function calling convention.

According to an example, the function calling convention may be reflected in the execution trace obtained in step 201. When a function is called, the program may push a parameter of the function into the stack. Since a function prototype of a system function is able to be checked and the prototype is unchangeable, the parameter transferring sequence for the call of a system function in the execution trace may be compared with the parameter sequence for a function prototype of the system function. Thus, it can be determined whether the parameter transferring sequence of the program function calling is from left to right or from right to left. After the execution of the called function is completed, sequence of operations leading to the parameter being popped from the stack may be observed, for example, whether the parameter popped from the stack is in the called function before function returning or in the calling function after function returning. Accordingly, the function calling convention for running the program may be determined based on the observed sequence. Time points on which the parameter and the return value of the function are pushed into or popped from the stack may be determined based on the function calling convention, which facilitates extraction of the parameter and the return value of a specific function.

The function call stack when the program runs to a specific time point may be identified according to the execution trace of the client program. A function call stack representing function hierarchy that the system is currently executing may be generated. Each storage unit of the stack may store a function entry address. The content of the stack may initially be set to null, or empty. Substantially simultaneously, a stain offset-function hierarchy table may be created. Each entry, or item, in the table may include attributes of an instruction in the execution trace, such as a memory address at which the instruction is stored, a stain offset in an operand of the instruction, and a current function call stack. The hierarchy table, when created, may be initially empty, or set to null. Instructions in the execution trace may be traversed sequentially and the following steps performed for each instruction.

In Step 204A, if the current instruction is determined to be a function call instruction, for example the current instruction containing a keyword such as "call", the address of the called function in the instruction may be recorded into the function call stack.

In Step 204B, if the current instruction is determined to be a function return instruction, for example the current instruction containing a keyword such as "ret", the data, which is currently on the top of the stack, may be popped from the stack.

In Step 204C, if the operand of the current instruction includes a stain mark, a new item in the stain offset-function hierarchy table may be created. Further, the memory address and the stain mark offset of the current instruction and the current function call stack may be recorded into the new item.

With steps 204A-204C, a stain offset-function hierarchy table is created. In an example, the difference between the stain offset-function hierarchy table and the stain propagation record table created in step 202 is that the stain propagation record table is an aggregation of the instructions and provides field division of the message; and the stain offset-function hierarchy table provides the function hierarchy of the stain mark. The function call stack of each item in the stain offset-function hierarchy table may include a linear function call relationship, and the function at the top of the stack may be related to the input message. The function call relationship during the processing procedure of the input message may be obtained by integrating the function call relationships in the whole table together.

A method for creating a function relationship diagram may include initializing a null function relationship diagram, traversing all the items in the stain offset-function hierarchy table sequentially, extracting the function call relationship of the function call stack of the item, and then adding the linear relationship into the function relationship diagram. The linear relationship of the function call in the function call stack may be a function call relationship in which functions are called layer by layer from the function address of a stack bottom unit to the function address of a stack top unit. In order to add the linear relationship into the function relationship diagram, nodes may be created for the units in the stack. Each node may represent one function in the stack. The content of the node may be represented by the function entry address. The nodes may be linked, or connected in an order from the stack bottom to the stack top to generate a chain. Consequently, a chain showing the function call relationship may be generated visualizing the call relationship, such as by depicting the connections by lines, or other visualization elements.

In an example, each item in the stain offset-function hierarchy table corresponds to one function call relationship chain. If a node in the relationship chain corresponding to a current traversed item, or instruction, does not belong to a current function relationship diagram, the node and the corresponding call relationship may be added into the diagram. If a call relationship in the relationship chain corresponding to the current traversed item, or instruction, does not belong to a current function relationship diagram, the call relationship may be added into the diagram. If all the nodes and the corresponding call relationships in the relationship chain corresponding to a current traversed item, or instruction, are already present in the current function relationship diagram, no node or call relationship is added. The next instruction, or item may be explored using similar steps.

Step 205 may include speculating, predicting, or determining semantic information of the input message.

The function relationship diagram obtained in step 204 provides a representation of the input message processing procedure performed by the malicious program client. Analysis of semantic information of the input message, may involve identifying system function calls used in the processing procedure. In an example, a system function call may be a C language library function called when running the client program and/or an Application Programming Interface (API) function provided by an operating system, such as Windows, Linux, Android, iOS, Unix or any other operating system of the device. The semantic information of the system function, i.e. any parameter and/or return value of the system function, may be identifiable. The information obtained until step 204 may be used to identify the semantic information of each field of the input message. During the input message processing procedure, the system function may be called to process some field. In such a case, the stain marks in the field of the input message may be propagated into the called system function during processing the field. Thus, if instructions including stain marks are found in a system function in the execution trace of the malicious program client, the system function may be identified as a participant in the input message processing procedure, particularly corresponding to the field with a stain mark. The stain mark may be a serial number.

In step 205, a semantic queue may be created. The semantic queue may be created for each byte of the input message. The semantic queue may store a system function related to the byte, and thus the input message processing procedure. In order to search the system function related to a stain mark, the stain mark may be searched in the execution trace and it is determined whether an identified location of the stain mark in the execution trace is within a system function call. If the stain mark is in a system function, the system function is identified as related to the processing procedure, and the system function may be added into the semantic queue of the byte corresponding to the stain mark. The distribution of the system function modules obtained in step 201 may include the memory address at which each system function module is loaded during execution of the malicious program client. Accordingly, it may be determined whether an address belongs to a system function and system function to which the address belongs to. For each byte of the input message, the semantic queue corresponding to the byte may be obtained by repeating the procedure above.

Thus, the field division of the input message may be obtained for the communication protocol possibly being used by the malicious client program being monitored by the analysis platform. Further, the function relationship, and the semantic queues of the input message may be extracted with the above steps.

Another example is described below by taking input message format extraction based on a communication protocol for an example malicious program client 'iptux'. Iptux is an instant messenger tool used in a local area network. In case of iptux, a specific network communication protocol is defined to implement communication among different hosts in the local area network. In the example, using steps described throughout the present disclosure, an input message based on the iptux communication protocol may be extracted. An example sequence of steps in this particular case may be as follows. Specific examples of the tables, trees and diagrams generated during an iptux message format extraction are given below.

Step 1 may include capturing an execution trace of an iptux program. Step 1 may further include starting a binary code analysis platform, copying a program to be analyzed, in this case iptux, into a system, for example, a simulation environment such as a virtual machine, and running, or executing the program. Step 1 may further include dynamically monitoring the program by the analysis platform. The program may establish a network connection and start communication. In response to receipt of an input message by the program through the network, Step 1 may continue by marking each byte of the input message with a stain offset. Further, Step 1 may involve recording a process procedure of the input message performed by the program, and writing recorded real-time information into an execution trace, which may be recorded in a file. Step 1 may further include extracting information from the execution trace, such as the number of instructions executed by the program i.e. iptux, the content of the input message, stain marks of all the bytes of the input message, and system functions run and called by the program. The contents of the bytes of the input message and the stain offsets are shown in Table 1.

TABLE 1

| Stain offset | Byte content |
| --- | --- |
| 0000 | 0x31 |
| 0001 | 0x5f |
| 0002 | 0x69 |
| 0003 | 0x70 |
| 0004 | 0x74 |
| 0005 | 0x75 |
| 0006 | 0x78 |
| 0007 | 0x5f |
| 0008 | 0x30 |
| 0009 | 0x23 |
| 0010 | 0x35 |
| 0011 | 0x23 |
| 0012 | 0x31 |
| 0013 | 0x3a |
| 0014 | 0x32 |
| 0015 | 0x37 |
| 0016 | 0x3a |
| 0017 | 0x6c |
| 0018 | 0x69 |
| 0019 | 0x75 |
| 0020 | 0x6c |
| 0021 | 0x75 |
| 0022 | 0x3a |
| 0023 | 0x73 |
| 0024 | 0x69 |
| 0025 | 0x73 |
| 0026 | 0x2d |
| 0027 | 0x64 |
| 0028 | 0x65 |
| 0029 | 0x73 |
| 0030 | 0x6b |
| 0031 | 0x74 |
| 0032 | 0x6f |
| 0033 | 0x70 |
| 0034 | 0x3a |
| 0035 | 0x32 |
| 0036 | 0x38 |
| 0037 | 0x38 |
| 0038 | 0x3a |
| 0039 | 0x6e |
| 0040 | 0x69 |
| 0041 | 0x68 |
| 0042 | 0x61 |

TABLE 1-continued

| Stain offset | Byte content |
| --- | --- |
| 0043 | 0x6f |
| 0044 | 0x00 |

Step 2 may include performing dynamic stain propagation analysis. A stain propagation record table may be created. The table may include a column for instruction memory address and a column for stain mark sequence. The table enables recording the instructions to which the stain marks are propagated. Step 2 may involve extracting the stain propagation record from the execution trace. Instructions in the execution trace may be traversed and executed in the simulation environment sequentially, and the following steps 2A to 2C may be executed for each of the instructions.

Step 2A may include checking whether there is a stain mark in the current instruction; if there is, step 2B may be initiated; otherwise, a next instruction may be processed.

Step 2B may include checking whether the address of the current instruction already exists in the in the stain propagation record table, such as in the column of instruction address. If the address does not exist in the column, a new item, or entry for the address may be created in the table. The address of the current instruction may be recorded in the new item and the stain mark included in the current instruction field of the new item. Alternatively, if the address already exists in the column, step 2C may be initiated.

Step 2C may include extracting, from the list, the stain mark sequence corresponding to the address of the current instruction. Step 2C may further include determining whether the stain offset included in the current instruction exists in the sequence. If the stain offset does not exist in the sequence the stain offset may be added into the sequence.

Accordingly, the stain propagation record table, a part of which is shown in Table 2, may be obtained.

TABLE 2

| Instruction address | Stain mark sequence |
| --- | --- |
| 0x41c37f | 39, 40, 41, 42, 43 |
| 0x41c41f | 35, 36, 37 |
| 0x41e7bb | 14, 15 |
| 0x438b47 | 17, 18, 19, 20, 21, 22, 23, 24, 25, 26, 27, 28, 29, 30, 31, 32, 33 |
| 0x4398bd | 01, 02, 03, 04, 05, 06, 07, 08, 09, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43 |
| 0x48b50f | 01, 02, 03, 04, 05, 06, 07, 08, 09, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 |
| 0x48b54b | 01, 02, 03, 04, 05, 06, 07, 08, 09, 10, 11, 12 |
| 0x48b915 | 23, 24, 25, 26, 27, 28, 29, 30, 31, 32, 33 |
| 0x48b8e6 | 17, 18, 19, 20, 21 |
| 0x5474e9 | 00, 01, 02, 03, 04, 05, 06, 07, 08, 09 |

Figure 3:
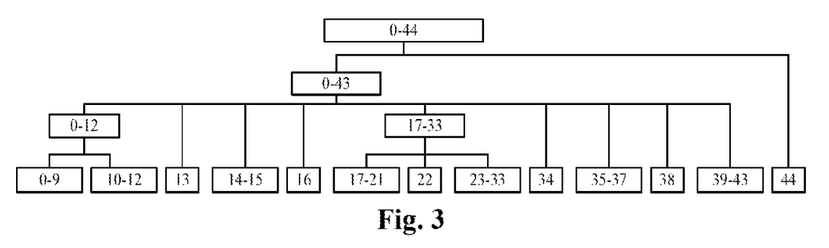
FIG. 3 is an exemplary tree for field division of a message according to an embodiment of the disclosure.

Step 3 may include dividing the input message into fields and generating a tree data structure, referred to as a field division tree of the input message, based on traversal of the stain propagation record table. For example, the input message may be divided into fields based on propagation of the stain marks of all the bytes in the input message during executing the instruction. An example field division tree of an input message obtained by this step is shown in FIG. 3. In the tree, the root node of the tree represents the entire input message, the leaf node represents a minimum field, and a node which is not a leaf node or a root node represents subordinate relationship between the fields of the input message.

A minimum field refers to a field that corresponds to a smallest set of consecutively numbered stain offsets. For example, in table 2 the stain offsets 0-9 are part of the stain propagation records for 0x4398bd (sequence 0-43), 0x48b50f (sequence 0-44), and 0x5474e9 (sequence 0-9). Each stain propagation record may have a corresponding respective field. However, in this example, among these fields, the field corresponding with the 0-9 sequence exclusively may be a minimum field with the field corresponding to the longer sequences that are inclusive of the 0-9 sequence, as parent nodes, as shown in FIG. 3. The parent nodes, in this example represent subordinate relationships between the fields, as the field corresponding to the sequence 0-44 is inclusive of the field corresponding to the sequence 0-43, which in turn is inclusive of the sequence 0-9. Step 3, which may generate a tree data structure with the nodes corresponding to the stain propagation records, may include at least steps 3A-3D described below.

Step 3A may include creating a tree data structure. The tree may initially include a root node, where the root node represents an input message and descendant nodes of the root node represent the fields and sub-fields of the input message.

Step 3B may include sequentially traversing the items of the stain propagation record table. The stain offsets in the stain mark sequences may be determined during the traversal. If the stain mark sequence of the current item that is being traversed is made up of multiple continuously-numbered stain offsets, the bytes corresponding to the multiple continuously-numbered stain offsets may be considered to be part of a single field. For example, in case of Table 2, each entry may be considered a single field, since each entry contains a sequence of stain offsets different than the other. Further, it may be determined if the tree contains a node corresponding to the field. If a corresponding node does not exist in the tree, a new node for the field may be created. Thus, in case of the Table 2, a node for each of the entries in the Table 2 may be created in the tree data structure.

Step 3C may include traversing all the items of the stain propagation record table again, and determining the stain offsets in the stain mark sequences. If the stain mark sequence of the current item being traversed includes the stain offsets of two or more nodes created in step 3B, Step 3C involves determining whether the fields corresponding to the two or more nodes should belong to, one, single combined field. In such a case, a new node corresponding to the combined field may be created in the tree. The new mode may be used as a parent node of the two or more nodes. Accordingly, the new parent node may be linked to the two or more nodes, such as by pointing the pointer of the parent node of the two or more nodes point to the new node. For example, in the example of Table 2, the multiple entries containing sequence 0-9 may be consolidated. Thus, a field, and a corresponding node for sequence 0-12 may be added based on the entries 0x5474e9 (sequence 0-9) and 0x48b54b (sequence 1-12). The consolidated entry may then be used as a parent of the nodes corresponding to the 0-9 and 1-12 sequences, as shown in FIG. 3.

In another example, if a sequence is identified such as that of 0x4398bd (sequence 0-43) in Table 2, the system may identify the nodes that correspond to shorter sequences have corresponding nodes in the tree data structure. For example, in this case, a node corresponding to the 1-12 sequence may already exist in the tree data structure, when a node for the 0-43 sequence is being added. In this case, the node corresponding to the nodes in the tree data structure may be updated to identify the longer, more inclusive sequence as a parent node. For example, a parent node of the existing node may be updated to point to the new node, and the new node, in turn may be pointed to the existing node. In the above example, consider that the tree contains a node for the 0-44 sequence pointing to the node for the 1-12 sequence, and a node for the 0-43 sequence is being added. The node for the 0-44 sequence may be pointed to the 0-43, indicating the 0-44 being inclusive of the 0-43 sequence and the node for 0-43 may be pointed to the 1-12 node, further indicating the 0-43 being inclusive of the 1-12 sequence. Thus, a subordinate relationship between the 0-44 node, 0-43 node, and 1-12 node is indicated.

Step 3D may include, if any new node is created in step 3C, repeating step 3C; and if no new node is created in step 3C, ending the flow.

Step 4 may include performing hierarchical division on functions used in the input message processing procedure. In this step, function call instructions and function return instructions used during running the client program may be monitored. A real-time function call stack may be analyzed during execution of the program, and accordingly, the hierarchical division of the functions may be implemented.

Initially, a function call stack may be created, or defined. The function call stack represents a function hierarchy that the system is currently in. The function call stack may contain multiple entries that may be referred to as a set of storage units. The contents of the stack initially may be set to null, or empty. Each storage unit of the stack may store a function entry address. Substantially simultaneously with the function call stack, a stain offset-function hierarchy table may be created. Each item in the hierarchy table corresponds to a respective instruction in the execution trace. An entry in the hierarchy table may include attributes such as a memory address where the instruction is stored, a stain offset in an operand of the instruction, and a current function call stack respectively. The hierarchy table may be initially set to null, or empty. The instructions in the execution trace may be traversed sequentially, and the following steps may be performed for each instruction to generate a stain offset-function hierarchy table, such as that shown in Table 3.

Step 4A may include determining if the current instruction is a function call instruction. For example, the current instruction may be checked for keywords such as "call." If the current instruction is a function call instruction, the address of the function being called in the instruction may be stored, i.e. pushed, in the function call stack.

Step 4B may include determining if the current instruction is a function return instruction. For example, the current instruction may be checked for keywords such as "ret." If the current instruction is a function return instruction, the data, which is currently on the top of the function call stack, is removed, i.e. popped, from the stack.

Step 4C may include determining if an operand of the current instruction includes a stain mark. If the stain mark exists, a new item may be created in the stain offset-function hierarchy table, and the memory address of the current instruction, the stain mark offset, and a current function call stack may be written into the new item. With the above steps, a stain offset-function hierarchy table is created and is shown in Table 3.

TABLE 3

| Instruction address | Function call stack |
|---|---|
| 0x41c37f | 0x506860-0x503b50-0x50ae80-0x41c2d0 |
| 0x41e7bb | 0x506860-0x503b50-0x41e7b0 |
| 0x438b47 | 0x506860-0x48b210-0x48b4f0-0x438b30 |
| 0x471f09 | 0x506860-0x503b50-0x50ae80-0x420210-0x470e10-0x471600 |
| 0x48b040 | 0x506860-0x503b50-0x48b040 |
| 0x48b43a | 0x506860-0x503b50-0x48b040-0x48b0c0-0x48b260-0x48b430 |
| 0x53e197 | 0x506860-0x503b50-0x50ae80-0x420210-0x53e197 |
| 0x51a9ea | 0x506860-0x51a9a0 |
| 0x503b51 | 0x506860-0x503b50 |

Figure 5:
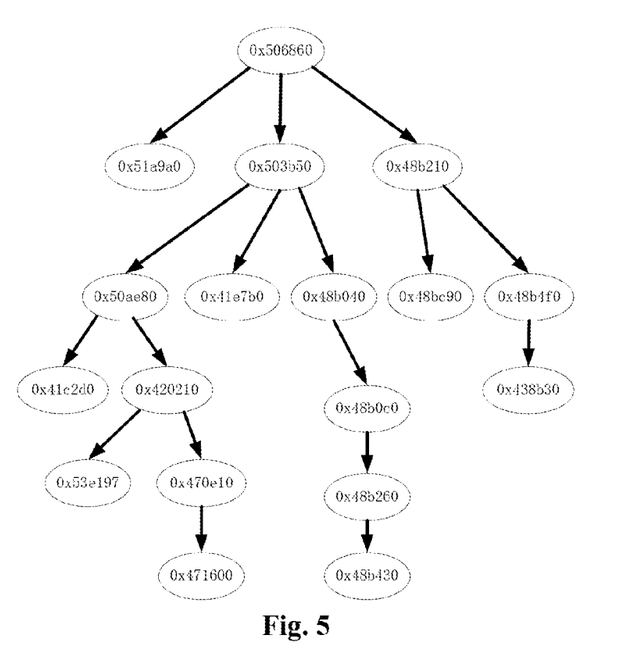
FIG. 5 is an exemplary function relationship diagram according to an embodiment of the disclosure.

FIG. 5 shows an example function relationship diagram obtained from the input message processing procedure, such as an input message of the iptux protocol. In FIG. 5, numbers in circles represent addresses of the instructions and the directions of arrows represent the call relationships.

Figure 4:
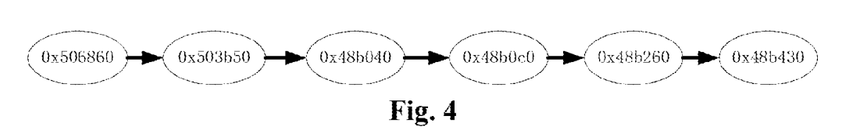
FIG. 4 is an exemplary function call relationship chain according to an embodiment of the disclosure.

A function relationship diagram, such as that shown in FIG. 5, may be generated using at least the following steps. A null function relationship diagram may be initialized. The items in the stain offset-function hierarchy table may be traversed sequentially to extract data used to generate the function relationship diagram. For example, a function call relationship may be extracted for the function call stack in an item of the hierarchy table, and a relationship between the two may be visualized in the function relationship diagram. Nodes may be created respectively for all units in the stack, where each node represents a function in the stack and the content of the node is represented by a function entry address. The nodes may be connected, such as by depicting lines, in an order from the stack bottom to the stack top to generate a chain. Consequently, a chain showing the function call relationship may be generated. FIG. 4 shows an example linear relationship of function calls in a stack. In FIG. 4, numbers in circles represent addresses of the instructions, and the directions of arrows represent the call relationships.

Each item in the stain offset-function hierarchy table corresponds to one function call relationship chain. If a node in the relationship chain corresponding to a current traversed item does not belong to a current function relationship diagram, the node and the corresponding call relationship may be added into the diagram. If some call relationship in the relationship chain corresponding to the current traversed item does not belong to a current function relationship diagram, the call relationship may be added into the diagram. If all the nodes and the corresponding call relationships in the relationship chain corresponding to a current traversed item belong to the current function relationship diagram, no node or call relationship may be added.

Step 5 may include analyzing semantic information of the input message. As described, in step 4, the function relationship diagram of the input message processing procedure of the malicious program client is obtained. Step 5 may use the function relationship diagram to analyze the semantic information of the input message to identify the input message format used by a communication protocol of the malicious program.

A semantic queue may be initially created for each byte of the input message. The semantic queue may store the system function related to the bytes. In order to search the system function related to a stain mark, the execution trace may be searched for the stain mark. Based on result of the search, it may be determined whether the stain mark is in a system function i.e. whether the system function uses, or has been passed data that has been stain marked. If the stain mark is in a system function, the system function may be related to the input message processing procedure. The system function may be added into the semantic queue of the byte corresponding to the stain mark. With the distribution of the system function modules obtained in step 1, it may be determined whether a memory address belongs to a system function and further which system function. A semantic queue corresponding to each byte of the input message may be generated by repeating the process above. The stain offsets, the addresses of the system functions, and the names of the system functions may be referred to Table 4.

TABLE 4

| Stain offset | Address of system function | Name of system function |
|---|---|---|
| 14, 15 | 0x7c80a864, 0x7c8106c7, 0x77d1a8ad | GetLocalTime, CreateThread, wsprintfA |
| 39, 40, 41, 42, 43 | 0x7c80c07f, 0x7c922645 | GetStringTypeExW, Strlen |
| 01, 02, 03, 04, 05, 06, 07, 08, 09, 10, 11, 12 | 0x7c922645 | Strlen |
| 35, 36, 37 | 0x804e3eb4 | InterlockedDecrement |

Figure 6:
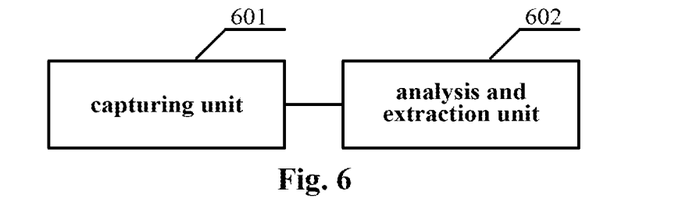
FIG. 6 is a schematic structure diagram of a device according to an embodiment of the disclosure.

FIG. 6 shows an example device for extracting a message format. The device may include circuitry comprising logical units, such as a processor, a memory storage device, a capturing unit 601, and an analysis and extraction unit 602.

The capturing unit 601 may capture an execution trace of a malicious program client.

The analysis and extraction unit 602 may analyze an input message processing procedure that may be followed by the malicious program client. The input message processing procedure may be identified and analyzed from the execution trace captured by the capturing unit 601. Based on the analysis, the analysis and extraction unit 602 may extract an input message format of a communication protocol for a malicious program.

The technical solution provided by a device for extracting a message format, involves analyzing the execution trace of the malicious program client, to identify the input message format of the communication protocol for the malicious program. The input message format may be extracted automatically without any manual operation. Therefore, degree of automation may be enhanced, reliance on human experience and labor cost may be reduced, and extraction efficiency may be increased. Further, by analyzing the execution trace of the malicious program client, system level semantic information may be provided, and fine-grained analysis on malicious codes may be implemented. Thus, analysis and positioning may be more accurate, and false positive rate may be reduced.

The capturing unit 601 may monitor an execution procedure of the malicious program in real time. The capturing unit 601 may use a binary code analysis platform for the monitoring, and may capture the execution trace of the processing procedure of the input message performed by the malicious program.

Figure 7:
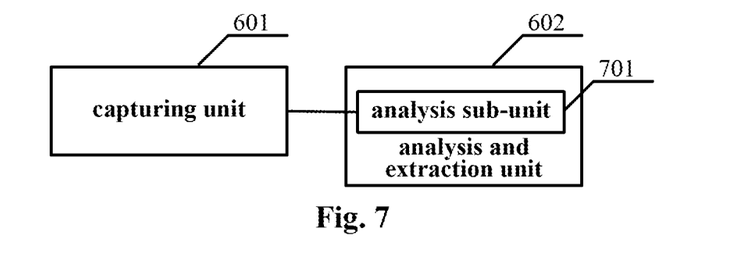
FIG. 7 is a schematic structure diagram of a device according to an embodiment of the disclosure.

As shown in FIG. 7, an example analysis and extraction unit 602 may include an analysis sub-unit 701. The analysis sub-unit 701 may perform stain marking on the execution trace. The analysis sub-unit 701 may further divide the input message into fields based on a stain propagation record of a mark. A function call relationship of the input message processing procedure may be determined based on the stain propagation. The analysis sub-unit 701 may establish a function relationship of the input message processing procedure and analyze semantic information of functions in the execution trace based on the function relationship of the input message processing procedure.

The analysis sub-unit 701 may determine a function call instruction and a function return instruction used in the input message processing procedure. The analysis sub-unit 701 may further determine a real-time function call stack used in the input message processing procedure based on the function call instruction and the function return instruction, and perform hierarchical division on the functions based on the function call stack.

In another example, the analysis sub-unit 701 may create a semantic queue for each byte of the input message. The semantic queue may store a system function related to the bytes. For each byte of the input message, the analysis sub-unit 701 may search through the execution trace for a stain mark. If the stain mark exists in a system function, it may be determined whether the system function is related to the input message processing procedure and the system function may be added into the semantic queue of the stain mark. Further, the semantic information of the input message may be determined based on the semantic queue corresponding to each byte of the input message.

In another example, the analysis sub-unit 701 may create a data structure tree. In the data structure tree, a leaf node may represent a field of the input message and a node which is not the leaf node or the root node represents a subordinate relationship between the fields of the input message. Initially, the tree may contain a root node that represents the input message. The analysis sub-unit 701 may traverse the stain propagation records sequentially and determine stain offsets in a stain mark sequence. If the stain mark sequence of a current item being traversed includes continuously-numbered stain offsets, bytes corresponding to the successively-numbered stain offsets are considered as part of one field. If no node for the field is created in the tree, a new node corresponding to the field may be created in the tree.

Alternatively, if the stain mark sequence of the current item being traversed includes the stain offset of a formerly-generated node in the tree, the analysis sub-unit 701 may determine whether a field corresponding to the formerly-generated node is one field. The analysis sub-unit 701 may create a new node for the field to be used as a parent node of the formerly-generated node and link the new parent node and the formerly-generated node, such as by making a pointer of one or both the nodes point to each other. The analysis sub-unit 701 may repeat the above procedure until the stain mark sequence of the current item being traverse contains no stain offset of a formerly-generated node.

Figure 8:
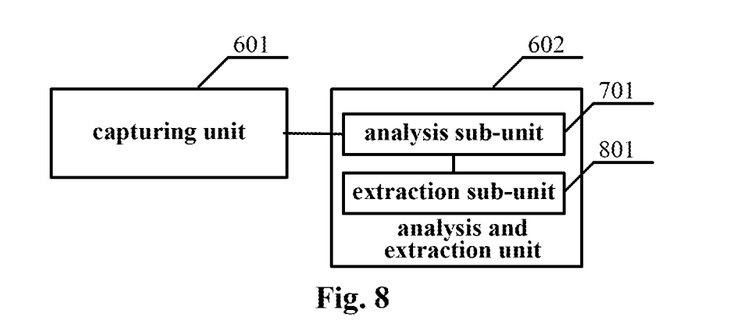
FIG. 8 is a schematic structure diagram of a device according to an embodiment of the disclosure.

As shown in FIG. 8, an example analysis and extraction unit 602 may include an extraction sub-unit 801. The extraction sub-unit 801, may determine the input message format of the communication protocol for the malicious program based on the semantic information of the functions in the execution trace, the divided fields of the input message, and the hierarchical division of the functions.

The device may have different or additional component units than those listed here. In addition, the names of the units described are intended to distinguish one unit from another, rather than to limit the scope of the disclosure.

Figure 9:
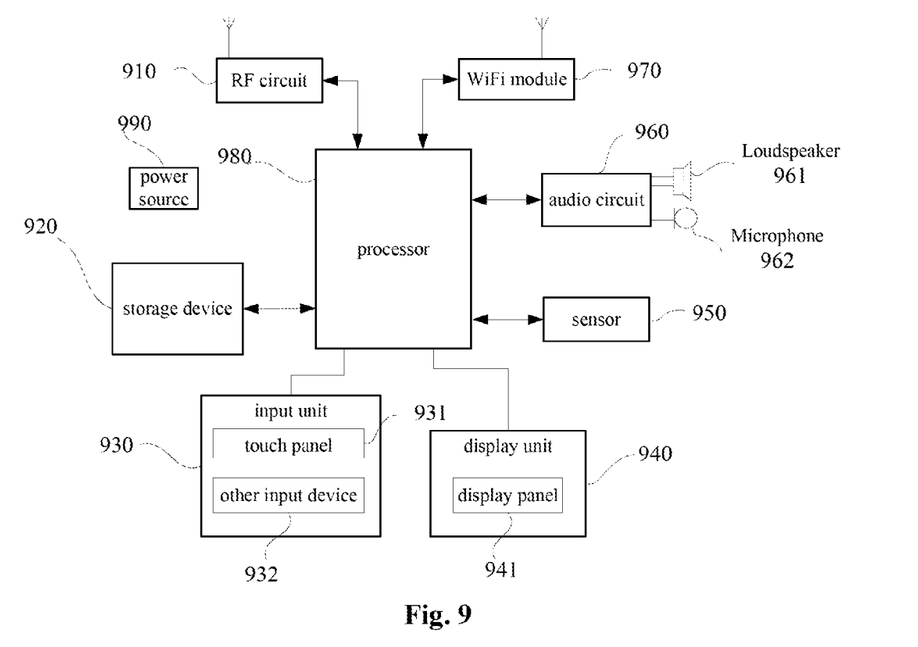
FIG. 9 is a schematic structure diagram of a device according to an embodiment of the disclosure.

FIG. 9 shows another example device for extracting a message format. For convenient illustration, only parts related to the disclosure are shown in FIG. 9. The device may have additional components and/or parts than those illustrated. The device may be a terminal device such as a mobile phone, a tablet computer, a personal digital assistant (PDA), a point of sales (POS) and an onboard computer. Here a case that the terminal is a mobile phone is taken as an example.

FIG. 9 is a block diagram illustrating part structure of a mobile phone related to the terminal provided according to the embodiment of the disclosure. As shown in FIG. 9, the mobile phone may include, for example, a radio frequency (RF) circuit 910, a storage device 920, an input unit 930, a display unit 940, a sensor 950, an audio circuit 960, a Wireless Fidelity (WiFi) module 970, a processor 980 and a power source 990. It should be understood by those skilled in the art that, the structure of the mobile phone shown in FIG. 9 is not intended to limit the mobile phone, and the mobile phone may include more or less components, or combined components, or different-arranged components than those shown in FIG. 9.

The components of the mobile phone are described in detail below in conjunction with FIG. 9.

The RF circuit 910 may receive and send signals during receiving and sending messages or during a phone call, and in particular, deliver downlink information of a base station to the processor 980 for processing and send uplink data to the base station. Generally, the RF circuit includes, for example, an antenna, at least one amplifier, a transceiver, a coupler, a Low Noise Amplifier (LNA) and a duplexer. In addition, the RF circuit 90 may communicate with a network or other devices through wireless communication. Any communication standard or protocol may be provided for the wireless communication. The communication standard or protocol includes, for example, Global System of Mobile communication (GSM), General Packet Radio Service (GPRS), Code Division Multiple Access (CDMA), Wideband Code Division Multiple Access (WCDMA), Long Term Evolution (LTE), email and Short Messaging Service (SMS).

The storage device 920 may store a software program and module. The processor 980 may execute different applications and processes data by running the software program and module stored in the storage device 920. The storage device 920 may mainly include a program storage area and a data storage area, where the program storage area may store, for example, an operating system, an application program for at least one function (e.g., a function of playing audio, a function of displaying image). The data storage area may store, for example, data (e.g., audio data, telephone book) created based on the usage of the mobile phone. In addition, the storage device 920 may include a high-speed random access memory, a nonvolatile storage such as at least one magnetic disk storage device or flash disk, and other volatile solid-state memory.

The input unit 930 may receive an input number or input character information, and generate a keyboard signal related to user setting and function control of the mobile phone 900. The input unit 930 may include a touch panel 931 and other input device 932. The touch panel 931, also referred to as a touch screen, may capture a touch operation performed on or near the touch panel (e.g., an operation performed on or near the touch panel 931 by a user with a finger, a stylus or any suitable object or accessory), and drive a corresponding connection device based on a preset program. Optionally, the touch panel 931 may include a touch detection device and a touch controller. The touch detection device detects touch direction of the user, detects a signal generated by the touch operation, and transmits the signal to the touch controller. The touch controller receives touch information from the touch detection device, converts the touch information into touch coordinates and transmits the touch coordinates to the processor 980. The touch controller is also able to receive a command transmitted from the processor 980 and execute the command. In addition, the touch panel 931 may be implemented by, for example, a resistive panel, a capacitive panel, an infrared panel and a surface acoustic wave panel. In addition to the touch panel 931, the input unit 930 may also include other input device 932. Specifically, the other input device 932 may include but not limited to one or more of a physical keyboard, a function key (such as a volume control button, a switch button), a trackball, a mouse and a joystick.

The display unit 940 may display information inputted by the user, information provided to the user, and various menus of the mobile phone. The display unit 940 may include a display panel 941. The display panel 941 may be configured in a form of, for example, Liquid Crystal Display (LCD) or Organic Light-Emitting Diode (OLED). Furthermore, the touch panel 931 may cover the display panel 941, and after the touch operation is detected on or near the touch panel 931, the touch operation is sent to the processor 980 to determine the type of the touch event, then the processor 980 provides a corresponding visual output on the display panel 941 based on the type of the touch event. Although in FIG. 9, the touch panel 931 and the display panel 941 are implemented as two independent components to achieve input and output functions of the mobile phone, the touch panel 931 and the display panel 941 may be integrated together to achieve input and output functions of the mobile phone according to other embodiments.

The mobile phone 900 may further include at least one sensor 950 such as an optical sensor and a motion sensor). The optical sensor may include an ambient light sensor and a proximity sensor. The ambient light sensor may adjust the brightness of the display panel 941 based on the intensity of ambient light. The proximity sensor may turn off the display panel 941 and/or a backlight when the mobile phone is moved near an ear. As one kind of the proximity sensor, a acceleration sensor may detect accelerations on all directions (usually three-axis directions), and detect the value and direction of the gravity in the stationary state. The acceleration sensor may be applied in, for example, mobile phone pose recognition (for example, switching between landscape and portrait, a correlated game, magnetometer pose calibration), a function about vibration recognition (for example, a pedometer, knocking). Other sensors such as a gyroscope, a barometer, a hygrometer, a thermometer, an infrared sensor, which may be further provided in the mobile phone, are not described here.

The audio circuit 960, a loudspeaker 961 and a microphone 962 may provide an audio interface between the user and the mobile phone. The audio circuit 960 may transmit an electric signal, converted from received audio data, to the loudspeaker 961, and a voice signal is converted from the electric signal and then outputted by the loudspeaker. The microphone 962 converts captured voice signal into an electric signal, the electric signal is received by the audio circuit 960 and converted into audio data. The audio data is outputted to the processor 980 for processing and then sent to another mobile phone via the RF circuit 910; or the audio data is outputted to the storage device 920 for further processing.

WiFi is a short-range wireless transmission technique. The mobile phone may, for example, send and receive E-mail, browse a webpage and access a streaming media for the user by the WiFi module 970, and provide wireless broadband Internet access for the user. Although the WiFi module 970 is shown in FIG. 9, it can be understood that the WiFi module 970 may be omitted in other example terminal devices.

The processor 980 may be a control center of the mobile phone, which connects various parts of the mobile phone by using various interfaces and wires, and may implement various functions and data processing of the mobile phone by running or executing the software programs and/or modules stored in the storage device 920 and calling data stored in the storage device 920, thereby monitoring the mobile phone as a whole. Optionally, the processor 980 may include one or more processing units. Preferably, an application processor and a modem processor may be integrated into the processor 980. The application processor may be used to process, for example, an operating system, a user interface and an application program. The modem processor may be used to process wireless communication. It can be understood that, the above modem processor may not be integrated into the processor 980.

The mobile phone 900 may further include the power source 990 (such as a battery) for providing power to all the components. The power source may be logically connected to the processor 980 through a power management system. Functions such as charging, discharging and power management are implemented by the power management system.

Although not shown, the mobile phone 900 may also include other modules such as a camera and a Bluetooth module, which are not described herein.

The processor 980 included in the terminal may perform at least the following steps. The following steps may be performed as part of execution of computer readable instructions that may be stored on a memory storage device.

The processor 980 may capture an execution trace of a malicious program client The processor 980 may analyze processing procedure of a message, such as an input message in the execution trace. The processor 980 may extract an input message format of a communication protocol for a malicious program based on the analysis of the execution trace and the processing procedure of the message.

In the technical solution according to this embodiment, by analyzing the execution trace of the malicious program client, the input message format of the communication protocol of the malicious program is extracted automatically without manual operation. Therefore, degree of automation is enhanced, reliance on human experience and labor cost are reduced, and extraction efficiency is increased. Further, by analyzing the execution trace of the malicious program client, system level semantic information is provided, fine-grained analysis on malicious codes is implemented. Thus, analysis and positioning are accurate, and false positive rate is decreased.

In another example, the capturing an execution trace of a malicious program client may include monitoring an execution procedure of the malicious program in real time by a binary code analysis platform. Further, the execution trace of the processing procedure of the message performed by the malicious program may be specifically captured.

In another example, the analyzing a processing procedure of the message in the execution trace may include performing stain marking on the execution trace. Further, the analysis may include dividing the input message into fields based on a stain propagation record of a stain mark. A function call relationship of the processing procedure of the message may be determined and a function relationship may be established for the processing procedure of the message. The semantic information of functions in the execution trace may be determined based on the function relationship of the processing procedure of the message.

In another example, the determining a function call relationship of the processing procedure of the message and establishing a function relationship of the processing procedure of the message may include at least the following steps. A function call instruction and a function return instruction used in the processing procedure of the message may be determined. A real-time function call stack used in the processing procedure of the message may be determined based on the function call instruction and the function return instruction. A hierarchical division on the functions may be performed based on the function call stack.

In an example, the determining the semantic information of functions in the execution trace based on the function relationship of the processing procedure of the message may include at least the following steps. For each byte of the message, a semantic queue may be created to store a system function related to the bytes. For each byte of the input message, the execution trace may be searched for a stain mark. If the stain mark exists in a system function, the system function may be deemed as related to the processing procedure and the system function may be added into the semantic queue of the stain mark. The semantic information of the input message may be determined based on the semantic queue corresponding to each byte of the input message.

In an example, the dividing the input message into fields based on a stain propagation record of a mark may include creating a data structure tree, which initially only contains a root node that represents the entire input message. In the data structure tree, a leaf node represents a field of the input message and a node which is not the leaf node or the root node represents a subordinate relationship between the fields of the input message.

The tree may generated by traversing the stain propagation records sequentially and determining stain offsets in a stain mark sequence. During the sequential traveral of the stain propagation records, a record that is currently being traversed may be examined and a node corresponding to that record may be created in the tree data structure. If a node corresponding to the record already, exists, the system may determine if the node may be consolidated with any other nodes of the tree. For example, if the stain mark sequence of a current record comprises continuously-numbered stain offsets, bytes corresponding to the successively-numbered stain offsets may be considered as a field. If no node for the field is created in the tree, a new node for the field may be created in the tree.

Alternatively, if the stain mark sequence of the current record comprises the stain offset of a formerly-generated node, a field corresponding to the formerly-generated node is identified. The system may determine whether the stain mark sequence of the current record and the data of the identified formerly-generated node may be consolidated as one filed. In such a case, a new node may be created, where the field may be used as a parent node of the formerly-generated node. Accordingly, a pointer of the existing parent node may be pointed to the new node. The tree may be generated by repeating the above steps until the stain mark sequence of a current item comprises no stain offset of a formerly-generated node.

In another example, the extracting an input message format of a communication protocol for a malicious program may include determining the input message format of the communication protocol for the malicious program based on the semantic information of the functions in the execution trace, the divided fields of the input message and the hierarchical division of the functions.

It should be understood by those skilled in the art that all or a part of the steps in the above embodiments may be implemented by instructing related hardware with a program. The program may be stored in a computer readable medium, which may be a read only memory, a magnetic disk, an optical disk or the like.

The above embodiments are just few embodiments of the technical solution provided by the disclosure, which should not be interpreted as limiting the disclosure. Any modification or equivalent replacement made by those skilled in the art within the technical scope disclosed in the embodiments of the disclosure should fall within the scope of protection of the disclosure. Therefore, the scope of protection of the disclosure should be based on the scope of protection of claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method for identifying a format of a message, comprising:
  capturing, using a hardware processor, an execution trace of an executable program, wherein the execution trace comprises a processing procedure used by the executable program to process the message received by the executable program;

performing, by the hardware processor, stain marking on the execution trace and extracting a stain propagation record indicating propagation of a stain mark of each byte of the message in the processing procedure;

dividing, by the hardware processor, the message into fields based on the stain propagation record, with bytes of the message corresponding to continuously-numbered stain offsets as one field;

performing, by the hardware processor, hierarchical division on functions in the execution trace and determining a function call relationship of the processing procedure;

analyzing, by the hardware processor, semantic information of the functions in the execution trace based on the function call relationship of the processing procedure; and determining, by the hardware processor, the format of the message based on the semantic information, the divided fields of the message, and the hierarchical division of the functions of the execution trace of the executable program, wherein the format of the message is a format of a message used by a communication protocol of a malicious program.

2. The method according to claim 1, wherein the capturing of the execution trace comprises:
  monitoring an execution procedure of the executable program in real time by a binary code analysis platform.

3. The method according to claim 1, wherein performing hierarchical division on functions in the execution trace further comprises:
  determining a function call instruction and a function return instruction used in the processing procedure of the message;
  determining a real-time function call stack used in the processing procedure of the message based on the function call instruction and the function return instruction; and
  performing hierarchical division on the functions based on the function call stack.

4. The method according to claim 1, wherein the analyzing of the semantic information of the functions in the execution trace based on the function call relationship of the processing procedure comprises:
  creating a semantic queue corresponding to each respective byte of the message, each semantic queue configured to store a system function related to the corresponding byte;
  searching the execution trace for a stain mark corresponding to each byte of the message;
  if the stain mark exists in a system function, adding the system function into the semantic queue of the stain mark; and
  determining the semantic information of the message based on the semantic queue corresponding to each byte of the message.

5. The method according to claim 1, wherein the dividing of the message into fields based on a stain propagation record of the mark comprises:
  creating a data structure tree comprising a root node, wherein the root node represents the message, a leaf node represents a minimum field of the message, and a node which is not a leaf node or the root node represents a subordinate relationship between the fields of the message;
  traversing the stain propagation records sequentially and determining stain offsets in a stain mark sequence;
  generating nodes in the data structure tree, a node corresponding to a set of successively-numbered stain offsets in the stain propagation records, wherein generating the nodes in the data structure tree further comprises:
    determining, within the data structure tree, a node corresponding to the set of successively-numbered stain offsets;
    creating a new node, in the data structure tree, for the set of successively-numbered stain offsets in response to absence of a corresponding node;
    if the stain mark sequence of the set of successively-numbered stain offsets comprises a stain offset included in a formerly-generated node within the data structure tree using the new node as a parent node of the formerly-generated node by:
      making a pointer of a parent node of the formerly-generated node point to the new node; and
    repeating until the stain mark sequence of the set of successively-numbered stain offsets comprises no stain offset of a formerly-generated node.

6. A device for extracting a format of a message, comprising a hardware processor and a non-transitory storage medium having a plurality of instructions stored thereon that when executed by the hardware processor cause the hardware processor to:
  capture an execution trace of an executable program, wherein the execution trace comprises a processing procedure used by the executable program to process the message received by the executable program;
  perform stain marking on the execution trace and extract a stain propagation record indicating propagation of a stain mark of each byte of the message in the processing procedure;
  divide the message into fields based on the stain propagation record, with bytes of the message corresponding to continuously-numbered stain offsets as one field;
  perform hierarchical division on functions in the execution trace and determine a function call relationship of the processing procedure;
  analyze semantic information of the functions in the execution trace based on the function call relationship of the processing procedure; and
  determine the format of the message based on the semantic information, the divided fields of the message, and the hierarchical division of the functions of the execution trace of the executable program, wherein the format of the message is a format of a message used by a communication protocol of a malicious program.

7. The device according to claim 6, wherein the instructions further cause the hardware processor to:
  monitor an execution procedure of the executable program in real time by a binary code analysis platform.

8. The device according to claim 6, wherein the instructions further cause the hardware processor to:
  determine a function call instruction and a function return instruction used in the processing procedure of the message;
  determine a real-time function call stack used in the processing procedure of the message based on the function call instruction and the function return instruction; and perform a hierarchical division on the functions based on the function call stack.

9. The device according to claim 6, wherein the instructions further cause the hardware processor to:
create a semantic queue corresponding to each respective byte of the message, wherein the semantic queue stores a system function related to the corresponding byte;
search the execution trace for a stain mark corresponding to each byte of the message, and based on the search:
add the system function into the semantic queue of the stain mark if the stain mark exists within the execution trace in a system function; and
determine the semantic information of the message based on the semantic queue corresponding to each byte of the message.

10. The device according to claim 6, wherein the instructions further cause the hardware processor to:
create a data structure tree, which comprises a root node, a leaf node, and an intermediate node, wherein the root node represents the message, the leaf node represents a minimum field of the message, and the intermediate node, a node which is not the leaf node or the root node, represents a subordinate relationship between the fields of the message;
traverse the stain propagation records sequentially and determine stain offsets in a stain mark sequence;
identify the stain mark sequence of a stain propagation record as a data-field in response to the stain propagation record comprising continuously-numbered stain offsets, wherein the data field is associated with bytes corresponding to the continuously-numbered stain offsets;
create a new node in the data structure tree for the data field, if no node for the data field exists;
identify if the stain mark sequence of the data field comprises a stain offset of a formerly-generated node in the data structure tree;
use the new node for the data field as a parent node of the formerly-generated node;
update a pointer of a parent node of the formerly-generated node to point to the new node; and
repeat until each stain offset of a formerly-generated node contained in the stain mark sequence is processed.

11. A non-transitory computer-readable medium storing a computer program, wherein execution of the computer program comprises:
capturing an execution trace of an executable program, wherein the execution trace comprises a processing procedure used by the executable program to process the message received by the executable program;
performing, by the hardware processor, stain marking on the execution trace and extracting a stain propagation record indicating propagation of a stain mark of each byte of the message in the processing procedure;
dividing, by the hardware processor, the message into fields based on the stain propagation record, with bytes of the message corresponding to continuously-numbered stain offsets as one field;
performing, by the hardware processor, hierarchical division on functions in the execution trace and determining a function call relationship of the processing procedure;
analyzing, by the hardware processor, semantic information of the functions in the execution trace based on the function call relationship of the processing procedure; and determining, by the hardware processor, the format of the message based on the semantic information, the divided fields of the message, and the hierarchical division of the functions of the execution trace of the executable program, wherein the format of the message is a format of a message used by a communication protocol of a malicious program.

12. The non-transitory computer-readable medium storing the computer program according to claim 11, wherein the capturing of an execution trace comprises:
monitoring an execution procedure of the executable program in real time by a binary code analysis platform.

13. The non-transitory computer-readable medium storing the computer program according to claim 11, wherein the performing hierarchical division on functions in the execution trace further comprises:
determining a function call instruction and a function return instruction used in the message processing procedure;
determining a real-time function call stack used in the processing procedure of the message based on the function call instruction and the function return instruction; and
performing hierarchical division on the functions based on the function call stack.

14. The non-transitory computer-readable medium storing the computer program according to claim 11, wherein analyzing of the semantic information of the functions in the execution trace based on the function call relationship of the processing procedure comprises:
creating a semantic queue corresponding to each respective byte of the message, the semantic queue configured to store a system function related to the corresponding byte;
searching the execution trace for a stain mark associated with each byte of the message;
in response to the stain mark being found in a system function, adding the system function into the semantic queue of the stain mark; and
determining the semantic information of the message based on the semantic queue corresponding to each byte of the message.

15. The non-transitory computer-readable medium storing the computer program according to claim 11, wherein the dividing of the message into fields based on the stain propagation record comprises:
creating a data structure tree which comprises a root node, a leaf node and an intermediate node which is not the leaf node or the root node, wherein the root node represents the message, the leaf nodes represent corresponding minimum fields of the message, and the intermediate node represents subordinate relationship between the fields of the message;
traversing the stain propagation records sequentially and determining stain offsets in a stain mark sequence;
determining whether the stain mark sequence of a stain propagation record comprises continuously-numbered stain offsets, and identifying bytes corresponding to the continuously-numbered stain offsets as a field;
if the data structure tree lacks a node corresponding to the field, creating a new node for the field;
if the stain mark sequence of a current item includes stain offset that is included in a formerly-generated node, using the new node as a parent node of the formerly-generated node and making a pointer of a parent node of the formerly-generated node point to the new node; and repeating until a stain offset of the stain mark sequence is included in a formerly-generated node is related in the data structure tree.

\* \* \* \* \*